(12) United States Patent
Marko

(10) Patent No.: US 12,715,415 B2
(45) Date of Patent: Aug. 25, 2026

(54) DIAPHRAGM ARRANGEMENT FOR A SPRING BRAKE ACTUATOR OF A PNEUMATIC BRAKING SYSTEM OF A VEHICLE

(71) Applicant: ZF CV Systems Europe BV, Brussels (BE)

(72) Inventor: Piotr Marko, Chrzastawa Mala (PL)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 19/206,405

(22) Filed: May 13, 2025

(65) Prior Publication Data

US 2025/0353483 A1 Nov. 20, 2025

(30) Foreign Application Priority Data

May 14, 2024 (EP) .................................... 24175662

(51) Int. Cl.
*B60T 17/08* (2006.01)
*B60T 13/38* (2006.01)

(52) U.S. Cl.
CPC ............ *B60T 17/083* (2013.01); *B60T 13/38* (2013.01)

(58) Field of Classification Search
CPC ............................... B60T 17/083; B60T 13/38
USPC ................................................ 92/63, 64, 99
See application file for complete search history.

(56) References Cited

U.S. PATENT DOCUMENTS 3,502,003 A * 3/1970 Dobrikin ............... B60T 17/083 92/64
5,799,564 A * 9/1998 Pierce .................. B60T 17/083 92/99
6,289,786 B1 * 9/2001 Plantan ................ B60T 17/083 29/888.051
2007/0063580 A1 * 3/2007 Scheckelhoff ........ B60T 17/085 303/3
2008/0067017 A1 * 3/2008 Scheckelhoff .......... F16D 65/28 188/170
2010/0154627 A1 6/2010 Prager et al.
2012/0006192 A1 * 1/2012 Rhoads ................ B60T 13/569 92/99

(Continued)

FOREIGN PATENT DOCUMENTS

JP 2006224792 A * 8/2006
KR 20140101541 A * 8/2014 ............ B60T 17/083
WO 2021110272 A1 6/2021

*Primary Examiner* — Thomas E Lazo
(74) *Attorney, Agent, or Firm* — Dickinson Wright PLLC

(57) ABSTRACT

A diaphragm arrangement (100) for a spring brake actuator (250) of a pneumatic braking system (210) of a vehicle (200*a*) enables a mechanical interaction between a piston pipe (255) of the spring brake actuator (250) and a push rod (260). The diaphragm arrangement (100) includes an outer diaphragm member (110), an inner diaphragm member (120), and a piston plate (130). The outer diaphragm member (110) is at least partially outwardly arranged from the inner diaphragm member (120) and the piston plate (130). The piston plate (130) deflects together with the pushrod (260). The outer diaphragm member (110) includes a central opening (111), and the inner diaphragm member (120) and/or the piston plate (130) are arranged to cover the opening (111). The outer diaphragm member (110), the inner diaphragm member (120), and the piston plate (130) are fixed to each other.

20 Claims, 3 Drawing Sheets

(56) References Cited

U.S. PATENT DOCUMENTS

2013/0239799 A1 * 9/2013 Bradford .............. B60T 17/083
92/63
2023/0001911 A1 * 1/2023 Arangarasan ......... B60T 17/086

* cited by examiner

DIAPHRAGM ARRANGEMENT FOR A SPRING BRAKE ACTUATOR OF A PNEUMATIC BRAKING SYSTEM OF A VEHICLE

BACKGROUND

The present disclosure relates to a diaphragm arrangement for a spring brake actuator of a pneumatic braking system of a vehicle, in particular utility vehicle. The disclosure also relates to a spring brake actuator for a pneumatic braking system of a vehicle, in particular utility vehicle, to a pneumatic braking system for a vehicle, in particular utility vehicle, and to a vehicle, in particular utility vehicle.

FIELD

Braking systems, such as air brake systems, are used to control the movement of vehicles, in particular utility vehicles, in a safe and effective manner. In particular, pneumatic brakes are used on utility vehicles such as trucks, trailers, and buses, which typically have large gross vehicle weights. The inertial mass of these vehicles, in combination with the speeds at which they might travel, requires a braking arrangement which responds rapidly with appropriate braking power. One system component of a pneumatic brake arrangement is a spring brake actuator. The spring brake actuator typically provides the necessary force when braking the vehicle.

Typically, a spring brake actuator includes a service brake part and parking brake part. In a diaphragm type spring brake actuator, two air-operated diaphragm brake actuators are typically arranged in a tandem configuration, which includes an air-operated service brake actuator for applying the normal operating brakes, and a spring brake actuator for applying the parking or emergency brakes. Both the service brake actuator and the spring brake actuator include a housing having an elastomeric diaphragm dividing the interior of the housing into two distinct fluid chambers.

The spring brake actuator includes the housing, the diaphragm to form a pressure chamber and a non-pressure chamber, also called a pushrod chamber, in the housing, a pushrod, and a pushrod plate, also called piston plate, connected with the pushrod and being arranged in the pushrod chamber. The spring brake actuator further includes a boot, a return spring, and a spring seat. The pressure chamber is fluidly connected to a source of pressurized air and the non-pressure chamber mounts the pushrod, which is couplable to the brake arrangement. Therein, the introduction and exhaustion of pressurized air into the pressure chamber reciprocates the pushrod into and out of the spring brake actuator along an axis to apply and release the operating brakes.

EP 4 069 563 A1 discloses a spring brake actuator, in particular a parking or emergency spring brake actuator for use in a commercial vehicle, said actuator including: a cylinder housing including a cylinder housing base, a spring brake piston located in said cylinder housing for applying a braking force, a spring guide being attached to the spring brake piston, a compression spring located between the cylinder housing base and the spring guide of the spring brake piston, said compression spring being effective to push the spring brake piston away from the base, wherein the spring guide includes a valve and a retaining device for retaining the valve, the retaining device including a basic body and clamping means for clamping the device to a spring guide. The spring brake piston is held in a brake release position by a positive pressure inside the pressure chamber. The spring brake piston is adapted to act upon a diaphragm of the spring brake actuator which transmits the inflicted force to a rod which, in turn, transmits the applied power to the wheel brakes.

In the prior art, a central area of the diaphragm is arranged between a parking piston pipe and the piston plate. During the application of an emergency brake and/or a parking brake, the parking piston pipe pushes the piston plate and thus the pushrod via the diaphragm. In other words, the parking piston pipe causes a deflection of the diaphragm which is reciprocated into a deflection of the piston plate. Therein, the diaphragm and the parking piston pipe are in mechanical contact with each other. Thus, there is a contact between the parking piston pipe, which is typically made of metal, and the diaphragm, which may be made of rubber. This contact may, due to the elasticity of the rubber, influence the output and/or performance of the device and may induce wear of the diaphragm at the contact.

SUMMARY

It is an object of the present disclosure to provide a technological contribution and to improve at least one aspect of the prior art. In particular, an object of the present disclosure may be to provide a more robust interaction between a parking piston pipe and a pushrod of a spring brake actuator for a pneumatic braking system.

The object is solved by the subject-matter according to the present disclosure and the preferred embodiments. In one aspect, the diaphragm arrangement is adapted to enable a mechanical interaction between a piston pipe of the spring brake actuator and a push rod According to an aspect of the present disclosure, a diaphragm arrangement for a spring brake actuator of a pneumatic braking system of a vehicle, in particular utility vehicle, is provided, wherein the diaphragm arrangement is adapted to enable a mechanical interaction between a piston pipe of the spring brake actuator and a push rod; and the diaphragm arrangement includes an outer diaphragm member, an inner diaphragm member and a piston plate, wherein the outer diaphragm member is at least partially outwardly arranged from the inner diaphragm member and from the piston plate; the piston plate is adapted to be deflected together with the pushrod; the outer diaphragm member is adapted to be mounted to a housing of the spring brake actuator; the outer diaphragm member includes a central opening; the inner diaphragm member and/or the piston plate is arranged to cover the opening; and the outer diaphragm member, the inner diaphragm member, and the piston plate are fixed to each other.

In other words, the diaphragm arrangement, which includes at least three different components, may replace the diaphragm of the prior art. Therein, the three different components, namely the outer diaphragm member, the inner diaphragm member, and the piston plate, are fixed to each other so that the outer diaphragm member enables an elastic deformation of the diaphragm arrangement and the inner diaphragm member may define a contact section that enables a contact between the diaphragm arrangement and the piston pipe. To achieve this, the outer diaphragm member of the disclosure includes the central opening, instead of a contact section for contacting the piston pipe as in the prior art. According to the disclosure, the central opening is covered by the inner diaphragm member and/or the piston plate. Thus, the piston pipe may mechanically interact with the inner diaphragm member and/or the piston plate, but not with outer diaphragm member.

The disclosure provides the ability to avoid and/or reduce destroying a central area of the diaphragm during the actuation of the piston pipe, because the piston pipe does not push directly on the rubber diaphragm as in the prior art. Instead, it is possible that the contact that transmits the deflection from the piston pipe via the piston plate to the push rod is formed between the inner diaphragm member and the parking piston pipe or between the parking piston pipe and the piston plate. This avoids wear of the rubber of the outer diaphragm member and may enhance the performance of the spring brake actuator due to avoiding a compression of a diaphragm in the contact section.

Optionally, the outer diaphragm member is adapted to elastically deform under a mechanical actuation by the piston pipe and/or of the push rod. This provides the ability for the inner diaphragm member to be rather stiff because the deformation of the diaphragm arrangement may be performed by the outer diaphragm member. This may provide a robust and reliable contact between the inner diaphragm member and the piston pipe.

Optionally, the outer diaphragm member includes an outer lip for sealingly mounting the outer diaphragm member to the housing. This may allow for a diaphragm of the prior art to be replaced by the diaphragm arrangement of the present disclosure.

Optionally, the outer diaphragm member includes an inner lip for sealingly fixing the outer diaphragm member relative to the inner diaphragm member and/or the piston plate. This provides the ability to sealingly separate two pressure chambers from each other by the diaphragm arrangement.

Optionally, the piston plate includes a groove and the inner lip projects into the groove. This enables an efficient manufacture of the diaphragm arrangement and a reliable sealing between the outer diaphragm member and the inner diaphragm member and/or the piston plate.

Optionally, the inner diaphragm member and the piston plate are fixed to each other by a crimped and/or punched connection. This may provide a cost-efficient and reliable fixation of the inner diaphragm member and the piston plate. Crimping and/or punching may avoid through holes and/or an additional sealant for fixating the inner diaphragm member and the piston plate to each other.

Optionally, the inner diaphragm member and the piston plate are fixed to each other by a threaded connection. A threaded connection may enable an efficient replacement of one or more components of the diaphragm arrangement. A threaded connection may provide a reliable fixation.

Optionally, the threaded connection includes at least one screw, wherein the screw is arranged recessed and/or in one level with respect to the inner diaphragm member. This achieves an arrangement such that a screw may not project from the inner diaphragm surface towards the piston pipe. This achieves a reliable mechanical contact and force transmission between the inner diaphragm member and the piston pipe.

Optionally, the threaded connection includes a thread sealant. The thread sealing, also called thread-locker, may further increase the reliability of the threaded connection.

Optionally, the inner diaphragm member and the piston plate are fixed to each other at circumferentially distributed connection sections. Fixing the inner diaphragm member and the piston plate to each other at circumferentially distributed connection sections may achieve that the inner diaphragm member and the piston plate are oriented parallel to each other and/or are aligned to each other. This improves a well-defined manufacturing of the diaphragm arrangement.

Optionally, the inner diaphragm member is a washer. This is a cost-effective embodiment of the inner diaphragm member. The washer may be made of metal, e.g., aluminum, and/or plastic.

Optionally, each of the outer diaphragm member, the inner diaphragm member and the piston plate is annular-shaped and defines an axial direction; and the outer diaphragm member is, in the axial direction, at least partially in an overlap section, arranged between the inner diaphragm member and the piston plate. This may enhance sealing and/or a reliability of the fixation of the components of the diaphragm arrangement.

According to an aspect of the disclosure, a spring brake actuator for a pneumatic braking system of a vehicle, in particular utility vehicle, is provided. The spring brake actuator includes the diaphragm arrangement as described above. Optionally, the diaphragm arrangement includes one or more features as described above as optional and/or preferred to achieve a technical effect corresponding thereto.

According to an aspect of the disclosure, a pneumatic braking system of a vehicle, in particular utility vehicle, is provided. The pneumatic braking system includes the spring brake actuator as described above and/or the diaphragm arrangement as described above. Optionally, the spring brake actuator and/or the diaphragm arrangement includes one or more features as described above as optional and/or preferred to achieve a technical effect corresponding thereto.

According to an aspect of the disclosure, a vehicle, in particular utility vehicle, is provided. The vehicle, in particular utility vehicle, includes the pneumatic braking system as described above, the spring brake actuator as described above and/or the diaphragm arrangement as described above. Optionally, the pneumatic braking system, the spring brake actuator and/or the diaphragm arrangement includes one or more features as described above as optional and/or preferred to achieve a technical effect corresponding thereto.

BRIEF DESCRIPTION OF THE DRAWINGS

Further advantages and technical features and their technical effects are disclosed in the figures and the description thereof.

The figures show preferred embodiments as follows.

DETAILED DESCRIPTION

Figure 1:
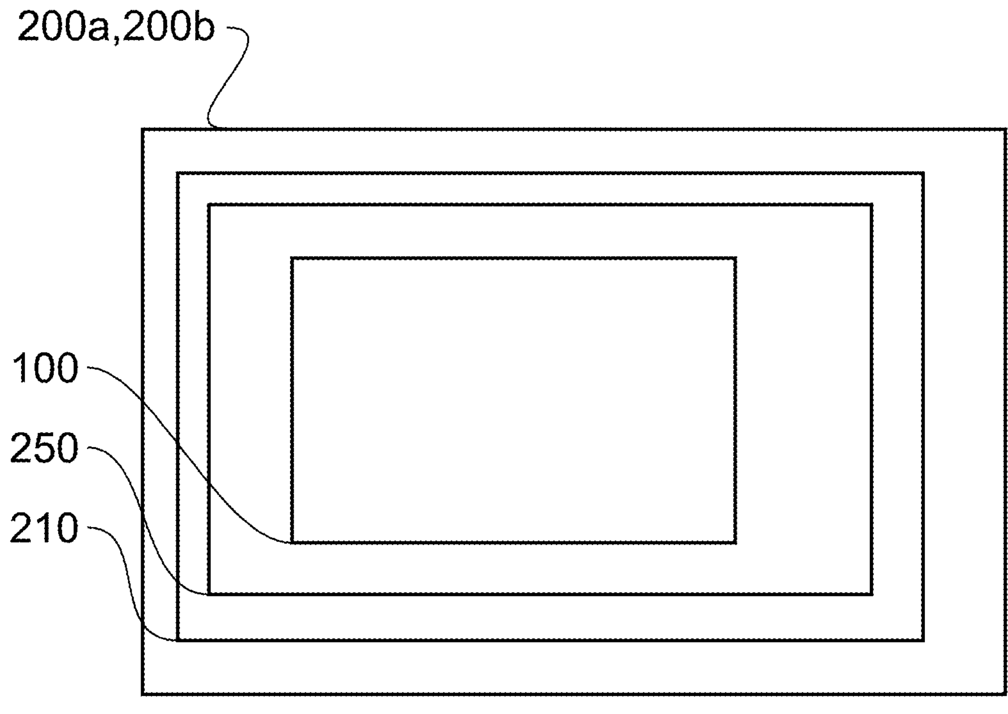
FIG. 1 is a schematic of a vehicle, in particular utility vehicle, according to an embodiment of the disclosure.

FIG. 1 shows a schematic of a vehicle 200*a*, in particular utility vehicle 200*b*, according to an embodiment of the present disclosure. In the following, the vehicle 200*a*, in particular utility vehicle 200*b*, is referred to as vehicle 200*a*, 200*b*. The vehicle 200*a*, 200*b* is a land vehicle 200*a*, 200*b*. For example, the vehicle 200*a*, 200*b* is a truck, a bus and/or towing vehicle of a vehicle combination.

The vehicle 200*a*, 200*b* includes a pneumatic braking system 210. The pneumatic braking system 210 includes pneumatic and optionally electric components. For example, a brake request by a driver and/or operator of the vehicle 200*a*, 200*b* may lead to a brake signal that causes a pneumatic and/or an electro-pneumatic actuation of the pneumatic braking system 210. Therein, pressurized air is provided and controlled to actuate the pneumatic braking system 210 to brake the vehicle 200*a*, 200*b*.

The pneumatic braking system 250 includes a spring brake actuator 250. Such a spring brake actuator 250 is further described with reference to FIGS. 2 to 5. The spring brake actuator 250 includes a diaphragm arrangement 100. Such a diaphragm arrangement 100 according to an embodiment of the disclosure is further described with reference to each of FIGS. 4 and 5.

Figure 2:
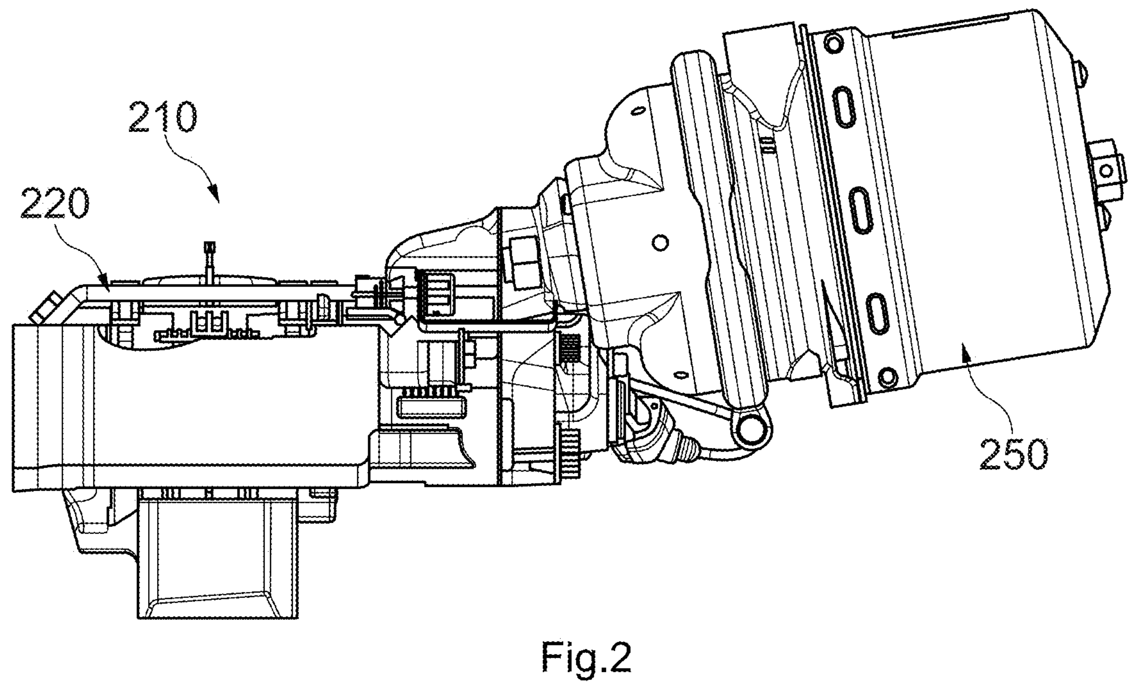
FIG. 2 is a side view of components of a pneumatic braking system according to an embodiment of the disclosure.

FIG. 2 shows a side view of components of a pneumatic braking system 210 according to an embodiment of the disclosure. The pneumatic braking system 210 is a pneumatic braking system 210 for a vehicle 200*a*, 200*b*. Such a vehicle 200*a*, 200*b* and pneumatic braking system 210 is described with reference to FIG. 1. FIG. 2 is described under reference to FIG. 1.

The components of the pneumatic braking system 210 include a pneumatic brake 220 and the spring brake actuator 250. The pneumatic brake 220 is a disc brake. The pneumatic brake 220 includes brake pads and a brake disc. The pneumatic brake 220 is adapted to be actuated to bring the brake pads and the disc into contact to create a braking torque. The spring brake actuator 250 is adapted to actuate and/or to release the pneumatic brake 220.

The spring brake actuator 250 is further described with reference to FIGS. 3 to 5.

Figure 3:
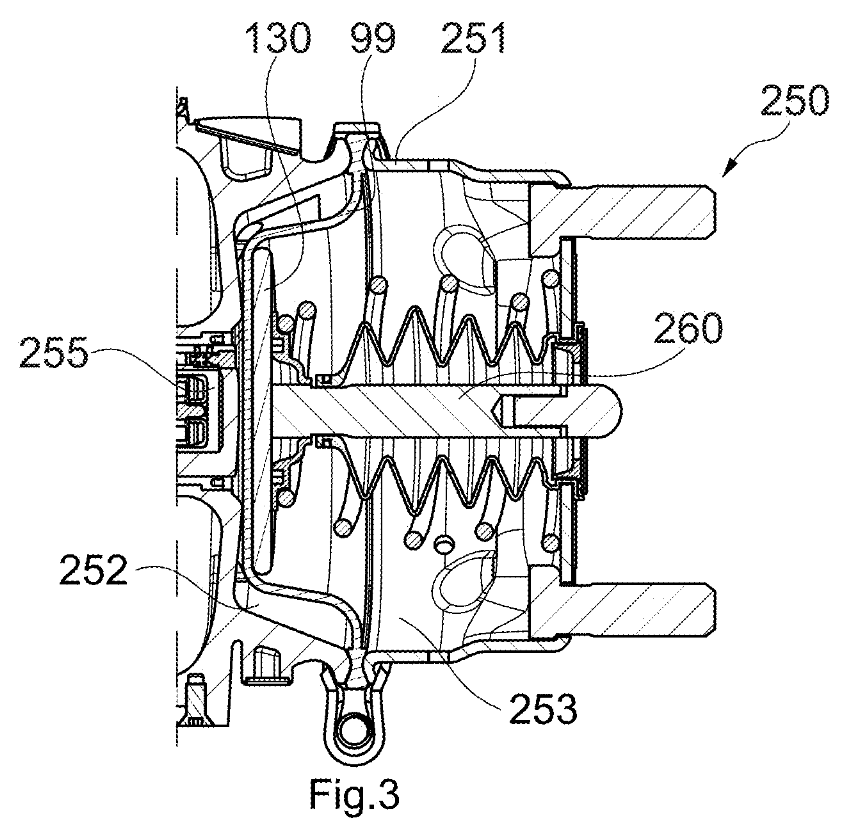
FIG. 3 is a sectional view of a spring brake actuator.

FIG. 3 shows a sectional view of a spring brake actuator 250. The spring brake actuator 250 of FIG. 3 is a spring brake actuator 250 with a diaphragm 99. The remaining components of the spring brake actuator 250 may be used with a diaphragm arrangement 100 as described below with reference to FIGS. 4 and 5.

The spring brake actuator 250 includes a housing 251, the diaphragm 99 and a piston pipe 255. The housing 251 provides pressure chamber 252 and a second chamber 253. The diaphragm 99 is arranged within the housing 251 to separate the pressure chamber 252 from the second chamber 253.

The diaphragm 99 is arranged between the piston pipe 255 and a piston plate 130. The piston pipe 255 is arranged within the pressure chamber 252 and is adapted to deflect, i.e., to move translationally, towards the second chamber 253. Therein, the diaphragm 99 is in mechanical contact and/or may be brought into mechanical contact with the piston pipe 255 and the piston plate 130, in particular during the application of an emergency or a parking brake. Then, the piston pipe 255 pushes, through the diaphragm 99, the piston plate 130. In this case, the metal piston pipe 255 and rubber diaphragm 99 are in contact with each other. The spring brake actuator 250 includes a push rod 260 which may be one-piece with the piston plate 130 and/or attached to the piston plate 130. Thus, a deflection of the piston plate 130 leads to a deflection of the push rod 260. The deflection of the push rod 260 may actuate the pneumatic brake 220.

According to embodiments of the present disclosure as described with reference to FIGS. 4 and 5, the diaphragm 99 of FIG. 3 may be replaced by a diaphragm arrangement 100 as described with reference to FIGS. 4 and 5.

Figure 4:
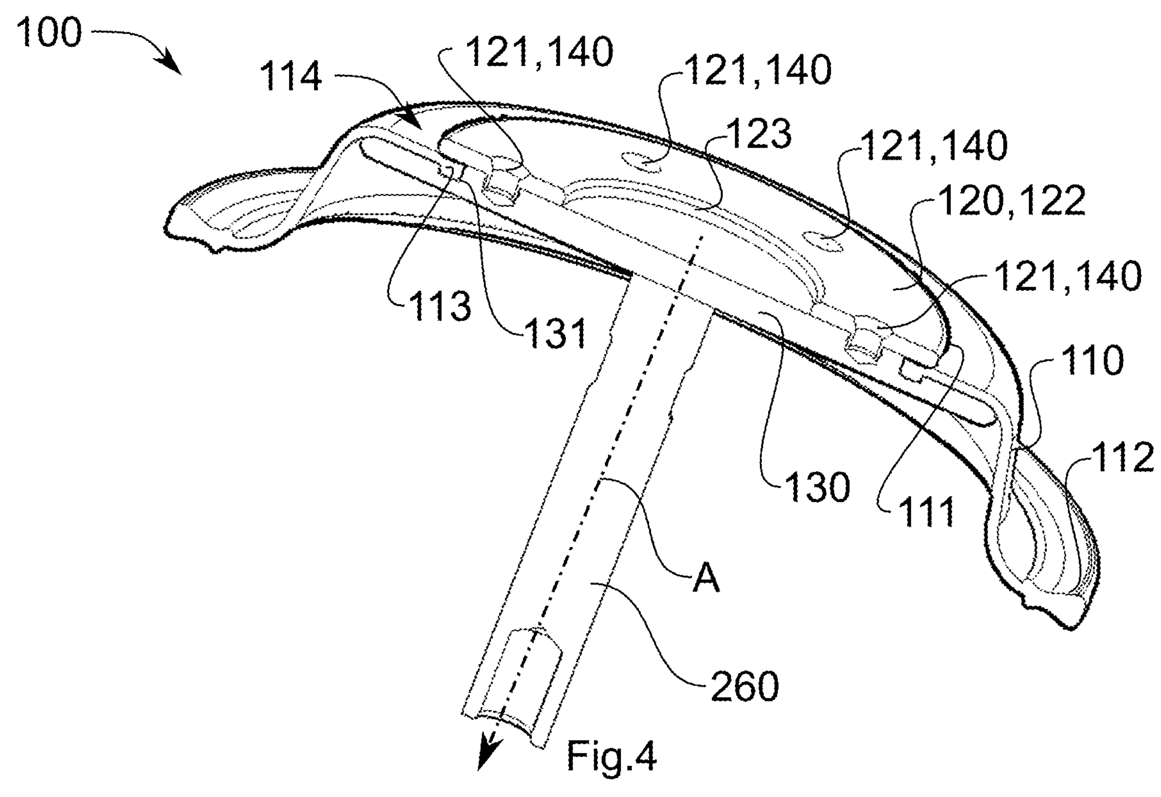
FIG. 4 is a sectional view of a diaphragm arrangement according to an embodiment of the disclosure.

FIG. 4 shows a sectional view of a diaphragm arrangement 100 according to an embodiment of the disclosure. The diaphragm arrangement 100 is a diaphragm arrangement 100 for a spring brake actuator 250. Such a spring brake actuator 250 is described with reference to FIG. 3. FIG. 4 is described under reference to FIGS. 1 to 3.

The diaphragm arrangement 100 includes three components: an outer diaphragm member 110, an inner diaphragm member 120, and a piston plate 130. Each of the outer diaphragm member 110, the inner diaphragm member 120, and the piston plate 130 is annular-shaped and defines an axial direction A.

The diaphragm arrangement 100 is adapted to enable a mechanical interaction between piston pipe 255 of the spring brake actuator 250 and push rod 260. The push rod 260 and the piston plate 130, in one aspect of the disclosure, are formed in one piece. The piston pipe 255 may transmit a force to and/or cause a displacement of the inner diaphragm member 120, which then may transmit a force to and/or cause a displacement of the piston plate 130 and the pushrod 260. Thus, the piston plate 130 is adapted to be deflected together with the pushrod 260.

The outer diaphragm member 110 is adapted to be mounted to a housing 251 of the spring brake actuator 250. Thus, the outer diaphragm member 110 includes a shape and/or size for mounting the outer diaphragm member 110 into and/or onto the housing in order to separate different chambers of the spring brake actuator 250 from each other. The outer diaphragm member 110 includes an outer lip 112 for sealingly mounting the outer diaphragm member 110 to the housing 251. The outer lip 112 is arranged at an outer circumference of the outer diaphragm member 110.

The outer diaphragm member 110 includes a central opening 111. The central opening 111 is arranged centrally with respect to the axial direction A. The central opening 111 extends from an axis that defines the axial direction A radially outwardly towards an inner lip 113 of the outer diaphragm member 110. The inner lip 113 is arranged at and defines an inner circumference of the outer diaphragm member 110.

The outer diaphragm member 110 is at least partially outwardly arranged relative to the inner diaphragm member 120 and relative to the piston plate 130. The inner diaphragm member 120 and the piston plate 130 is arranged to cover the opening 111. Therein, the piston plate 130 covers the opening 111 entirely and the inner diaphragm member 120 covers the opening 111 partially, i.e., an outer section of the opening 111 is covered by the inner diaphragm member 120.

In one aspect, the inner diaphragm member 120 is a washer 122. The washer 122 is arranged to mechanically interact with the piston pipe 255. The washer 122 is a disc-shaped plate with a central opening. The washer 122 is made of metal or plastics.

The outer diaphragm member 110 is adapted to elastically deform under a mechanical actuation by the piston pipe 255 and/or of the push rod 260. In one aspect, the outer diaphragm member 110 is made of rubber. The outer diaphragm member 110 includes an elasticity that enables a deformation of the outer diaphragm member 110.

The outer diaphragm member 110, the inner diaphragm member 120, and the piston plate 130 are fixed to each other. The outer diaphragm member 110 includes the inner lip 113. The inner lip 113 is adapted to sealingly fix the outer diaphragm member 110 and the inner diaphragm member 120 and the piston plate 130. For receiving the inner lip 113, the piston plate 130 includes a groove 131. The inner lip 113 projects into the groove 131. The outer diaphragm member 110 is, in the axial direction A, at least partially in an overlap section 114, arranged between the inner diaphragm member

120 and the piston plate 130. In other words, the outer diaphragm member 110, the inner diaphragm member 120, and the piston plate 130 are arranged in a sandwich structure, wherein the outer diaphragm member 110 is arranged between the inner diaphragm member 120 and the piston plate 130.

The inner diaphragm member 120 and the piston plate 130 are fixed to each other at circumferentially distributed connection sections 121. In one aspect, the connection sections 121 are equally distributed circumferentially. In FIG. 4, the inner diaphragm member 120 and the piston plate 130 are fixed to each other at six circumferentially distributed connection sections 121. In another embodiment, any other number larger than two of connection sections 121 may be used.

The inner diaphragm member 120 and the piston plate 130 are fixed to each other by a crimped and/or punched connection 140. By the crimped and/or punched connection, the sandwich structure as explained above is fixed. Therein, the inner diaphragm member 120 and the piston plate 130 are pressed towards each other and the outer diaphragm member 110 is confined between the inner diaphragm member 120 and the piston plate 130.

The diaphragm arrangement 100 provides tight connection between the outer diaphragm member 110 and piston plate 130 for use in the spring brake actuator 250. The diaphragm arrangement 100 includes the outer diaphragm member 110, the piston plate 130 and, as an additional element, the inner diaphragm member 120 as a plate with hole, i.e., a washer, or solid plate, which connect both parts. The inner edge of the outer diaphragm member 110 provides the inner lip 113 between the piston plate 130 with the dedicated groove 131 and the inner diaphragm member 120.

Figure 5:
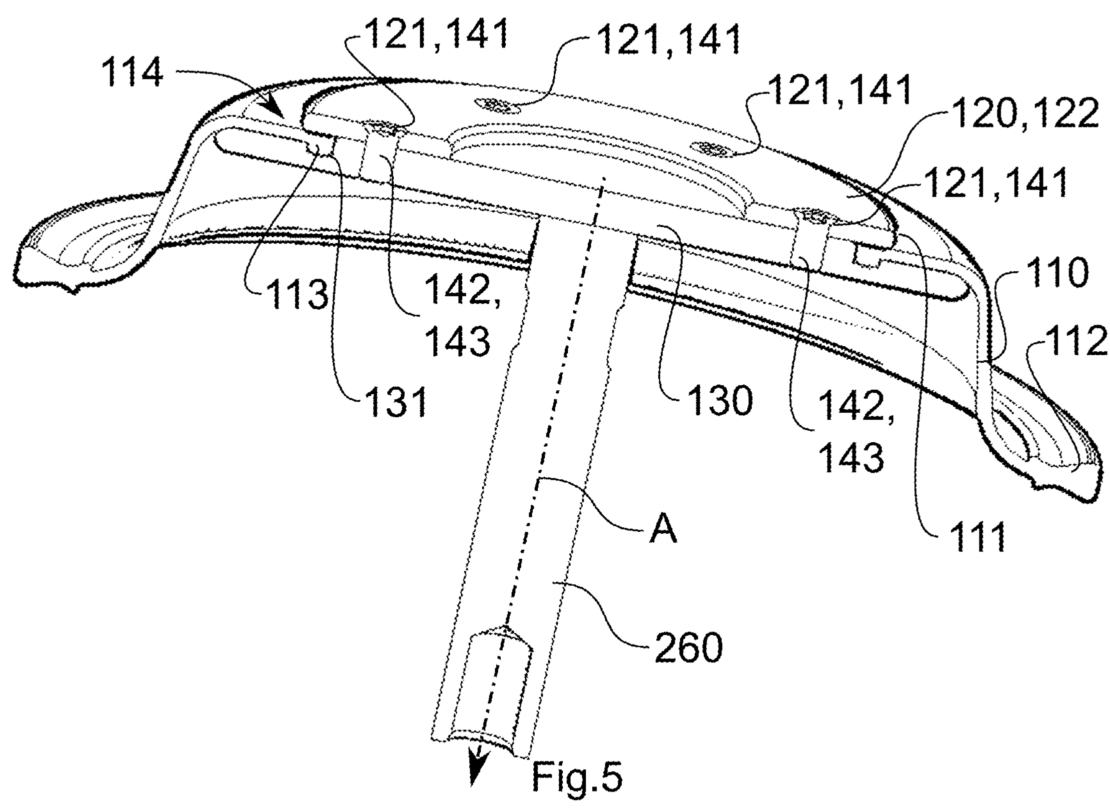
FIG. 5 is a sectional view of a diaphragm arrangement according to an embodiment of the disclosure.

FIG. 5 shows a sectional view of a diaphragm arrangement 100 according to an embodiment of the disclosure. The diaphragm arrangement 100 of FIG. 5 is an alternative to the diaphragm arrangement 100 of FIG. 4. FIG. 5 is described under reference to FIG. 4, wherein differences are described.

In FIG. 5, the inner diaphragm member 120 and the piston plate 130 are fixed to each other by a threaded connection 141. The threaded connection 141 includes a plurality of screws 142. The screws 142 may be equally distributed circumferentially. In FIG. 5, the inner diaphragm member 120 and the piston plate 130 are fixed to each other by six circumferentially distributed screws 142. In another embodiment, any other number larger than two of screws 142 may be used.

Each of the screws 142 is arranged recessed, or in one level, with respect to the inner diaphragm member 120. Thus, the inner diaphragm member 120 includes through-holes, in each of which one of the screws 142 is inserted. The through-holes may include a cylindrical geometry and/or a frustoconical section for receiving a head of one of the screws 142.

The threaded connection 141 includes a thread sealant 143. The threaded sealant 143 is arranged between the screws 142 and the inner diaphragm member 120. To provide tight connection between the inner diaphragm member 120 and piston plate 130, the thread sealant 143 is applied on the screws 142 or other threaded elements. A screw head may be in the same level as the inner diaphragm member 120 or may be hidden in one of the holes.

In another embodiment, the inner diaphragm member 120 and the piston plate 130 are fixed to each other by a threaded connection 141 as shown in FIG. 5 and by a crimped and/or punched connection 140 as shown in FIG. 4. In other words, the embodiments of FIGS. 4 and 5 may be combined.

LIST OF REFERENCE SIGNS (PART OF THE DESCRIPTION)

99 diaphragm
100 diaphragm arrangement
110 outer diaphragm member
111 central opening
112 outer lip
113 inner lip
120 inner diaphragm member
121 connection section
122 washer
123 washer opening
130 piston plate
131 groove
140 crimped and/or punched connection
141 threaded connection
142 screw
143 thread sealant
**200*a*** vehicle
**200*b*** utility vehicle
210 pneumatic braking system
220 pneumatic brake
250 spring brake actuator
251 housing
252 pressure chamber
253 second chamber
255 piston pipe
260 push rod
A axial direction

What is claimed is:

1. A diaphragm arrangement (100) for a spring brake actuator (250) of a pneumatic braking system (210) of a vehicle (**200*a*, 200*b***), comprising:

an outer diaphragm member (110), an inner diaphragm member (120), and a piston plate (130), wherein the outer diaphragm member (110) is at least partially radially outwardly arranged relative to the inner diaphragm member (120) and the piston plate (130);

wherein the piston plate (130) deflects together with a pushrod (260) for a spring brake actuator;

wherein the outer diaphragm member (110) is configured for mounting to a housing (251) of the spring brake actuator;

wherein the outer diaphragm member (110) includes a central opening (111);

wherein the inner diaphragm member (120) and/or the piston plate (130) cover the central opening (111);

wherein the outer diaphragm member (110), the inner diaphragm member (120) and the piston plate (130) are fixed to each other;

wherein the diaphragm arrangement (100) is adapted to enable a mechanical interaction between a piston pipe (255) of the spring brake actuator and the push rod (260);

wherein the inner diaphragm member (120) and the piston plate (130) are fixed to each other at circumferentially distributed connection sections (121).

2. The diaphragm arrangement (100) as claimed in claim 1, wherein the outer diaphragm member (110) elastically deforms under a mechanical actuation by the piston pipe (255) and/or of the push rod (260).

3. The diaphragm arrangement (100) as claimed in claim 1, wherein the outer diaphragm member (110) includes an outer lip (112) configured for sealingly mounting the outer diaphragm member (110) to the housing (251) of the spring brake actuator.

4. The diaphragm arrangement (100) as claimed claim 1, wherein the outer diaphragm member (110) includes an inner lip (113) that sealingly fixes the outer diaphragm member (110) relative to the inner diaphragm member (120) and the piston plate (130).

5. The diaphragm arrangement (100) as claimed in claim 4, wherein the piston plate (130) includes a groove (131) and the inner lip (113) projects into the groove (131).

6. The diaphragm arrangement (100) as claimed in claim 4, wherein the central opening defines an inner circumference of the inner diaphragm member (110), wherein the inner lip is disposed at the inner circumference.

7. The diaphragm arrangement (100) as claimed in claim 6, wherein an outer diameter of the pressure plate (130) is greater than an outer diameter of the inner diaphragm member (120), wherein the inner diameter of the outer diaphragm member is smaller than the outer diameter of the inner diaphragm member.

8. The diaphragm arrangement as claimed in claim 7, wherein the groove is disposed radially inward from the outer diameter of the inner diaphragm member (110).

9. The diaphragm arrangement (100) as claimed in claim 1, wherein the inner diaphragm member (120) and the piston plate (130) are fixed to each other by a crimped and/or punched connection (140).

10. The diaphragm arrangement (100) as claimed in claim 1, wherein the inner diaphragm member (120) and the piston plate (130) are fixed to each other by a threaded connection (141).

11. The diaphragm arrangement (100) as claimed in claim 10, wherein the threaded connection (141) includes at least one screw (142), wherein the screw (142) is arranged recessed or in one level with respect to the inner diaphragm member (120).

12. The diaphragm arrangement (100) as claimed in claim 10, wherein the threaded connection (141) includes a thread sealant (143).

13. The diaphragm arrangement (100) as claimed in claim 1, wherein the inner diaphragm member (120) is a washer (122).

14. The diaphragm arrangement (100) as claimed in claim 1, wherein the outer diaphragm member (110), the inner diaphragm member (120), and the piston plate (130) are annular-shaped and define an axial direction (A); and wherein the outer diaphragm member (110) is, in the axial direction (A), at least partially in an overlap section (114), wherein the outer diaphragm member is at least partially arranged axially between the inner diaphragm member (120) and the piston plate (130) in the overlap section.

15. The diaphragm arrangement (100) as claimed in claim 1, wherein the outer diaphragm member (110) is flexible rubber and the inner diaphragm member (120) is metal.

16. The diaphragm arrangement (100) as claimed in claim 1, wherein the piston plate (130) and push rod (260) are one piece.

17. A spring brake actuator (250) for a pneumatic braking system (210) of a vehicle (200*a*, 200*b*) including the diaphragm arrangement (100) as claimed in claim 1.

18. A pneumatic braking system (210) for a vehicle (200*a*, 200*b*), wherein the pneumatic braking system (210) includes the spring brake actuator (250) as claimed in claim 17.

19. A vehicle (200*a*, 200*b*) including the pneumatic braking system (210) as claimed in claim 18.

20. A diaphragm arrangement (100) for a spring brake actuator (250) of a pneumatic braking system (210) of a vehicle (200*a*, 200*b*), comprising:

an outer diaphragm member (110), an inner diaphragm member (120), and a piston plate (130), wherein the outer diaphragm member (110) is at least partially radially outwardly arranged relative to the inner diaphragm member (120) and the piston plate (130);

wherein the piston plate (130) deflects together with a pushrod (260) for a spring brake actuator;

wherein the outer diaphragm member (110) is configured for mounting to a housing (251) of the spring brake actuator;

wherein the outer diaphragm member (110) includes a central opening (111);

wherein the inner diaphragm member (120) and/or the piston plate (130) cover the central opening (111);

wherein the outer diaphragm member (110), the inner diaphragm member (120) and the piston plate (130) are fixed to each other;

wherein the diaphragm arrangement (100) is adapted to enable a mechanical interaction between a piston pipe (255) of the spring brake actuator and the push rod (260);

wherein the inner diaphragm member (120) and the piston plate (130) are fixed to each other by a crimped and/or punched connection (140).

* * * * *